(12) United States Patent
Sato et al.

(10) Patent No.: US 7,976,919 B2
(45) Date of Patent: Jul. 12, 2011

(54) MULTILAYER BLOW MOLDED CONTAINER AND PRODUCTION PROCESS THEREOF

(75) Inventors: Takashi Sato, Omitama (JP); Satoru Suzuki, Omitama (JP); Daisuke Itoh, Omitama (JP)

(73) Assignee: Kureha Corporation, Tokyo (JP)

(*) Notice: Subject to any disclaimer, the term of this patent is extended or adjusted under 35 U.S.C. 154(b) by 911 days.

(21) Appl. No.: 11/887,267

(22) PCT Filed: Mar. 31, 2006

(86) PCT No.: PCT/JP2006/307387
§ 371 (c)(1),
(2), (4) Date: Sep. 27, 2007

(87) PCT Pub. No.: WO2006/107099
PCT Pub. Date: Oct. 12, 2006

(65) Prior Publication Data
US 2009/0269526 A1    Oct. 29, 2009

(30) Foreign Application Priority Data
Apr. 1, 2005   (JP) .................................. 2005-106940

(51) Int. Cl.
*B32B 27/08* (2006.01)

(52) U.S. Cl. .................... 428/36.7; 428/34.1; 428/35.7; 428/36.6

(58) Field of Classification Search ................ 428/34.1, 428/35.7, 35.8, 35.9, 36.4, 36.6, 36.7
See application file for complete search history.

(56) References Cited

U.S. PATENT DOCUMENTS
6,673,403 B1    1/2004   Shiiki et al.
6,951,956 B2 *  10/2005  Yamane et al. ............... 562/587

FOREIGN PATENT DOCUMENTS
| EP | 1 449 646 A1 | 11/2002 |
| JP | 02-032813 | 7/1988 |
| JP | 03-247437 | 2/1990 |
| JP | 10-138371 | 9/1997 |
| JP | 2003-020344 | 7/2001 |
| JP | 2003-136657 | 11/2001 |
| JP | 2003-300293 | 4/2002 |
| WO | WO 2006/107099 A1 | 3/2006 |

OTHER PUBLICATIONS
International Search Report for PCT/JP2006/307387 dated Jul. 18, 2006.

* cited by examiner

*Primary Examiner* — Walter B Aughenbaugh
(74) *Attorney, Agent, or Firm* — Reed Smith LLP

(57) ABSTRACT

A multilayer blow molded container having a layer structure that a polyglycolic acid layer is provided as a core layer, and thermoplastic polyester resin layers are arranged as inner and outer layers, wherein the core layer formed of the polyglycolic acid layer is not present between the inner and outer layers in at least part of an opening end portion of the container, and the core layer formed of the polyglycolic acid layer is not present between the inner and outer layers in at least part of a bottom of the container, wherein the melt viscosity x of a polyglycolic acid forming the polyglycolic acid layer is 300 to 900 Pa·s as measured at a temperature of 270° C. and a shear rate of 122 sec$^{-1}$, the melt viscosity y of a thermoplastic polyester resin forming the thermoplastic polyester resin layers is 250 to 600 Pa·s as measured at a temperature of 290° C. and a shear rate of 122 sec$^{-1}$, and a melt viscosity ratio x/y between both melt viscosities is 0.85 to 1.80, and a production process thereof.

12 Claims, 3 Drawing Sheets

MULTILAYER BLOW MOLDED CONTAINER AND PRODUCTION PROCESS THEREOF

TECHNICAL FIELD

The present invention relates to a multilayer blow-molded container having a layer structure that a polyglycolic acid layer is provided as a core layer, and thermoplastic polyester resin layers are arranged as inner and outer layers, and a production process thereof. More particularly, the present invention relates to a multilayer blow molded container which has a layer structure that a core layer formed of a polyglycolic acid layer is embedded in between thermoplastic polyester resin layers, is narrow in a scatter of thickness of the core layer and excellent in molding properties, appearance, gas barrier properties, strength and the like, and a production process thereof.

BACKGROUND ART

Plastic bottles are widely used containers replacing glass bottles and metallic cans because they are light in weight and high in impact resistance. Plastic bottles used as containers for various kinds of drinks and foods are produced in many cases by blow molding of a thermoplastic resin. As such blow molded containers, bottles (hereinafter abbreviated as "PET bottle") obtained by blow-molding polyethylene terephthalate (hereinafter abbreviated as "PET") are widely spread as containers for carbonated drinks, fruit juice drinks, sports drinks, tea drinks, coffee drinks and the like because they are excellent in transparency and glossiness. The PET bottles are generally formed from a single layer of PET.

However, PET is insufficient in gas barrier properties and particularly involves a problem that the gas barrier properties of a body of a PET bottle, the thickness of which is thin, is low. If the gas barrier properties of the PET bottle are low, functions of long-term storage and prevention from deterioration of contents thereof become insufficient. In recent years, the miniaturization of PET bottles has been advanced. A proportion of a bottle surface area to an internal volume becomes high attending on the miniaturization, so that the PET bottles are more and more required to have good gas barrier properties.

On the other hand, attention is paid to a polyglycolic acid (hereinafter may be referred to as "PGA") as a resin material having high gas barrier properties. Japanese Patent Application Laid-Open No. 10-138371 (hereinafter referred to as "Article 1") has proposed a gas barrier multilayer hollow container having a layer structure that a polyglycolic acid layer is arranged as a core layer, and thermoplastic polyester resin layers are arranged as inner and outer layers. Example 4 of Article 1 shows a production example of a multilayer hollow container of a 5 layer structure by a co-injection stretch blow molding process, in which a polyglycolic acid layer is provided as a core layer, and inner and outer layers formed of PET layers are each arranged through an adhesive layer. More specifically, Example 4 of Article 1 shows that a multilayer preform having a layer structure of "PET/adhesive/PGA/adhesive/PET" was molded by injection molding, and the multilayer preform was then subjected to stretch blow molding to produce a multilayer hollow container.

Article 1 discloses a wide variety of melt viscosities as to the polyglycolic acid used. However, in each Example, a polyglycolic acid having a melt viscosity of 4,000 Pa·s as measured at a temperature of the melting point+20° C. and a shear rate of 100 sec$^{-1}$ is used. This melt viscosity, 4,000 Pa·s corresponds to about 1,900 Pa·s as measured at a temperature of 270° C. and a shear rate of 122 sec$^{-1}$. When the polyglycolic acid having such a high melt viscosity is injection-molded to form a multilayer preform, it is difficult to uniformly control the thickness of the resulting polyglycolic acid layer unless an injection temperature is preset to a high temperature of 255° C. or higher. However, it has been found that when the injection temperature of the polyglycolic acid is preset to a high temperature, the polyglycolic acid remaining in an injection molding machine tends to cause thermal decomposition. When the polyglycolic acid undergoes thermal decomposition, the appearance and gas barrier properties of the resulting multilayer blow molded container are impaired. In addition, according to the co-injection stretch blow molding process disclosed in Article 1, it is difficult to surely embed the polyglycolic acid layer, which is easy to be decomposed under environmental conditions in a thermoplastic resin layer.

Japanese Patent Application Laid-Open No. 2003-20344 (hereinafter referred to as "Article 2") discloses a stretched multilayer blown container in which a polyglycolic acid having a melt viscosity of not lower than 20 Pa·s, but lower than 500 Pa·s as measured at a temperature of the melting point+20° C. and a shear rate of 100 sec$^{-1}$ is arranged as a core layer. Example 7 of Article 2 discloses a co-injection multilayer stretch blow molded container of a 5 layer structure that a layer of a polyglycolic acid having a melt viscosity of 45 Pa·s is provided as a core layer, and inner and outer layers formed of PET layers are each arranged through an adhesive layer. However, the co-injection multilayer stretch blow molded container disclosed in Article 2 involves problems that the polyglycolic acid having a low melt viscosity is used and that it is difficult to surely embed the polyglycolic acid layer, which is easy to be decomposed under environmental conditions in a thermoplastic resin layer.

The melt viscosity of not lower than 20 Pa·s, but lower than 500 Pa·s as described in Article 2 corresponds to a melt viscosity of not lower than 9 Pa·s, but lower than 235 Pa·s as measured at a temperature of 270° C. and a shear rate of 122 sec$^{-1}$. If the molt viscosity of the polyglycolic acid is too low, a hold-over phenomenon that a polyglycolic acid layer forming a core layer is cleaved into plural layers is liable to occur when co-injection molding is conducted together with a thermoplastic polyester resin having a relatively high melt viscosity to form a preform. When the core layer, which will become a gas barrier layer, is cleaved into 2 or more layers, it is difficult to uniformly control the thickness of the core layer.

Japanese Patent Application Laid-Open No. 2003-136657 (hereinafter referred to as "Article 3") discloses a multilayer container having a layer structure that a polyglycolic acid layer is provided as a core layer, and thermoplastic polyester resin layers are arranged as inner and outer layers. More specifically, Article 3 discloses a process in which a multilayer preform is formed by a co-injection molding process, and the multilayer preform is then subjected to biaxial stretch blow molding to produce a multilayer container. According to the process disclosed in Article 3, a stretched multilayer blow molded container of a form that the polyglycolic acid layer is embedded in a PET layer at the body and bottom of the container is obtained.

Article 3 discloses polyglycolic acids having a wide variety of melt viscosities. However, Examples thereof only disclose a polyglycolic acid having a melt viscosity of 500 Pa·s as measured at a temperature of 240° C. and a shear rate of 100 sec$^{-1}$. The melt viscosity, 500 Pa·s of the polyglycolic acid described in Article 3 corresponds to 235 Pa·s as measured at a temperature of 270° C. and a shear rate of 122 sec$^{-1}$. If the melt viscosity of the polyglycolic acid is too low, the hold-over phenomenon that a polyglycolic acid layer forming a core layer is cleaved into plural layers is liable to occur when co-injection molding is conducted together with a thermoplastic polyester resin having a relatively high melt viscosity to form a multilayer preform. When the core layer, which will become a gas barrier layer, is cleaved into 2 or more layers, it is difficult to uniformly control the thickness of the core layer.

Examples 1 and 2 of Article 3 show that a PET having a melt viscosity of 190 Pa·s as measured at a temperature of 280° C. and a shear rate of 100 sec$^{-1}$ was used as the thermoplastic polyester resin. This melt viscosity of the PET is relatively low. When the thermoplastic resin having a too low melt viscosity is used, the mechanical strength of the resulting multilayer blow molded container is deteriorated.

DISCLOSURE OF THE INVENTION

It is an object of the present invention to provide a multilayer blow molded container having a layer structure that a polyglycolic acid layer is provided as a core layer, and thermoplastic polyester resin layers are arranged as inner and outer layers, in which the container has a structure that the core layer formed of the polyglycolic acid layer is embedded in between the thermoplastic resin layers, is narrow in a scatter of thickness of the core layer and excellent in gas barrier properties, appearance, molding properties, strength and the like, and a production process thereof.

Processes for producing a multilayer blow molded container having a structure that a core layer formed of a polyglycolic acid layer is embedded in between thermoplastic polyester resin layers include a process, in which a polyglycolic acid and a thermoplastic polyester resin are first subjected to co-injection molding to form a bottomed multilayer preform having a layer structure that a polyglycolic acid layer is provided as a core layer, and thermoplastic polyester layers are arranged as inner and outer layers, and the multilayer preform is then subjected to stretch blow molding. However, the multilayer preform obtained by this process has involved problems that the core layer tends to cause a scatter of thickness, and that strength at the bottom of the resulting multilayer blow molded container may possibly be lowered when the core layer is formed up to the bottom of the multilayer preform.

The present inventors have found that a process, in which an injection molding machine having a plurality of injection cylinders is used, a thermoplastic polyester resin is partially injected into a cavity of a single mold for molding a preform through a gate from an injection cylinder, a polyglycolic acid is then injected from another injection cylinder at the same time as injection of the thermoplastic polyester resin to form a core layer formed of a polyglycolic acid layer in the thermoplastic polyester resin held in a molten state in the cavity, and lastly the thermoplastic polyester resin is injected to produce a bottomed multilayer preform having a structure that the bottom is sealed with the thermoplastic polyester resin, is effective for the production of a bottomed multilayer preform by co-injection molding.

According to the production process described above, there can be provided a multilayer blow molded container having a body of a layer structure that the thermoplastic polyester resin layers are arranged on both surfaces of the core layer formed of the polyglycolic acid layer, in which no polyglycolic acid layer is substantially arranged at an opening end portion (neck portion) and a bottom. In a multilayer blow molded container, high gas barrier properties are mainly required of a body having a thin thickness, and necessary gas barrier properties can be surely achieved at the opening end portion and bottom each having a great thickness even by a single thermoplastic polyester resin layer.

However, it has been found that when a polyglycolic acid having a high melt viscosity is used to form a multilayer preform according to the above-described process, the injection temperature of the polyglycolic acid must be controlled to a high temperature for uniformly controlling the thickness of the core layer. By the way, the polyglycolic acid remaining in an injection molding machine tends to cause thermal decomposition when the injection temperature of the polyglycolic acid is made high, so that the appearance and gas barrier properties of the resulting multilayer blow molded container are impaired. When the injection temperature of the polyglycolic acid having a high melt viscosity is made low, the resulting polyglycolic acid layer tends to cause a scatter of thickness.

When the thickness unevenness of the polyglycolic acid layer in the multilayer preform obtained by the co-injection molding becomes great, the gas barrier properties at a thin portion thereof are lowered. In other words, the gas barrier properties of the whole multilayer blow molded container (bottle) are lowered even when the amount of the polyglycolic acid filled in the co-injection molding is the same, so that it is extremely important to mold a polyglycolic acid layer having a uniform thickness. However, it is difficult to mold polyglycolic acid layer having a uniform thickness. In general, the thickness of the polyglycolic acid layer becomes thinner as the body of a bottle comes nearer to the vicinity of the bottom thereof. Such a tendency becomes stronger as the volume of the multilayer preform becomes smaller, or the amount of the polyglycolic acid filled is made smaller for thinning the core layer.

When a polyglycolic acid having a low melt viscosity is used on the other hand, the molding of a multilayer preform by co-injection molding with a thermoplastic polyester resin shows a tendency for a layer of the polyglycolic acid in a layer of the thermoplastic polyester resin to be cleaved into 2 or more layers, so that a portion thin in thickness is liable to occur in addition to difficulty in controlling the thickness, and the gas barrier properties of the resulting multilayer blow molded container become insufficient. Such a tendency can be relieved by making the melt viscosity of the thermoplastic polyester resin lower than the melt viscosity of the polyglycolic acid. However, when a thermoplastic polyester resin having a melt viscosity lower than the melt viscosity of the polyglycolic acid is used, the properties of the resulting multilayer blow molded container, such as heat resistance and strength, are easy to be lowered.

The present inventors have carries out an extensive investigation with a view toward achieving the above-described object. As a result, it has been found that when a polyglycolic acid having a viscosity of 300 to 900 Pa·s as measured at a temperature of 270° C. and a shear rate of 122 sec$^{-1}$ and a thermoplastic polyester resin having a viscosity of 250 to 600 Pa·s as measured at a temperature of 290° C. and a shear rate of 122 sec$^{-1}$ are used, a multilayer preform narrow in the scatter of thickness of a polyglycolic acid layer, which will become a core layer, is obtained even when the polyglycolic acid is co-injection molded together with the thermoplastic polyester resin at a relatively low injection temperature lower than 255° C. It has been further found that a melt viscosity ratio of the melt viscosity of the polyglycolic acid to the melt viscosity of the thermoplastic polyester resin is controlled within a specific range, whereby co-injection moldability can be highly balanced with various properties of the resulting multilayer blow molded container, such as heat resistance and strength. The present invention has been led to completion on the basis of these findings.

According to the present invention, there is thus provided a multilayer blow molded container having a layer structure that a polyglycolic acid layer is provided as a core layer, and thermoplastic polyester resin layers are arranged as inner and outer layers, wherein the melt viscosity x of a polyglycolic acid forming the polyglycolic acid layer is 300 to 900 Pa·s as measured at a temperature of 270° C. and a shear rate of 122 sec$^{-1}$, the melt viscosity y of a thermoplastic polyester resin forming the thermoplastic polyester resin layers is 250 to 600 Pa·s as measured at a temperature of 290° C. and a shear rate of 122 sec$^{-1}$, and a melt viscosity ratio x/y between both melt viscosities is 0.85 to 1.80.

The multilayer blow molded container may desirably have a structure that at a body of the container, the core layer formed of the polyglycolic acid layer is arranged in a state embedded in between the thermoplastic polyester resin layers that are the inner and outer layers, and at an opening end portion and a part or the whole of a bottom of the container, a thermoplastic polyester resin layer containing no core layer formed of the polyglycolic acid layer is arranged.

According to the present invention, there is also provided a process for producing a multilayer blow molded container, which comprises co-injection molding a polyglycolic acid and a thermoplastic polyester resin to form a bottomed multilayer preform having a layer structure that a polyglycolic acid layer is provided as a core layer, and thermoplastic polyester resin layers are arranged as inner and outer layers, and then subjecting the multilayer preform to stretch blow molding, wherein the container is a multilayer blow molded container having a layer structure that the polyglycolic acid layer is provided as the core layer, and the thermoplastic polyester resin layers are arranged as the inner and outer layers, and wherein the melt viscosity x of the polyglycolic acid is 300 to 900 Pa·s as measured at a temperature of 270° C. and a shear rate of 122 sec$^{-1}$, the melt viscosity y of the thermoplastic polyester resin is 250 to 600 Pa·s as measured at a temperature of 290° C. and a shear rate of 122 sec$^{-1}$, and a melt viscosity ratio x/y between both melt viscosities is 0.85 to 1.80.

In the step of forming the multilayer preform, the multilayer preform may desirably be formed by using an injection molding machine equipped with 2 injection cylinders A and B to co-injection mold the polyglycolic acid and the thermoplastic polyester resin in a cavity of a single mold for molding a preform through a gate, and at this time the multilayer preform may be formed through the following Steps 1 to 3:

i) Step 1 of first injecting a part of the thermoplastic polyester resin from one injection cylinder A, ii) Step 2 of then injecting the polyglycolic acid at an injection temperature lower than 255° C. from the other injection cylinder B at the same time as injection of the thermoplastic polyester resin from the injection cylinder A to form a core layer formed of a polyglycolic acid layer in the thermoplastic polyester resin held in a molten state in the cavity, and iii) Step 3 of lastly injecting the thermoplastic polyester resin from the injection cylinder A to produce a bottomed multilayer preform having a structure that the core layer formed of the polyglycolic acid layer is arranged in a state embedded at a body, and an opening end portion and a part or the whole of a bottom is sealed with the thermoplastic polyester resin.

BEST MODE FOR CARRYING OUT THE INVENTION

1. Polyglycolic Acid

Figure 1:
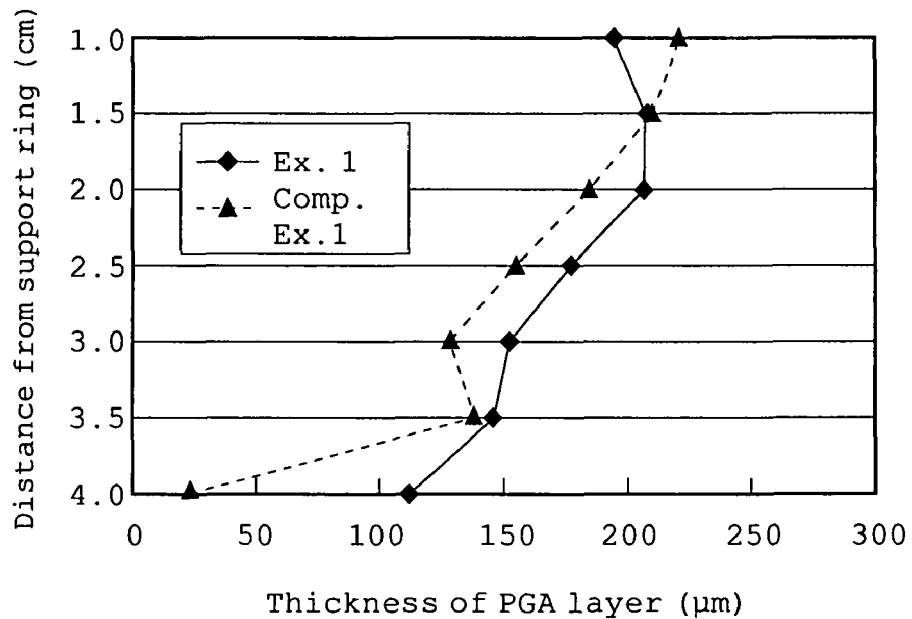
FIG. 1 is a graph illustrating thickness distributions at the bodies of respective multilayer preforms obtained in Example 1 and Comparative Example 1.

The polyglycolic acid used in the present invention is a homopolymer or copolymer containing a repeating unit represented by the following formula (1):

The content of the repeating unit represented by the formula (1) in the polyglycolic acid is at least 60% by weight, preferably at least 70% by weight, more preferably 80% by weight based on the whole repeating unit, and the upper limit thereof is 100% by weight. If the content of the repeating unit represented by the formula (1) is too low, the resulting multilayer blow molded container shows a tendency to lower gas barrier properties and heat resistance.

The polyglycolic acid can be synthesized by, for example, dehydration polycondensation of glycolic acid, dealcoholization polycondensation of an alkyl glycolate or ring-opening polymerization of glycolide. In order to obtain a polyglycolic acid having a high melt viscosity, it is desirable to use a synthetic process of subjecting glycolide having a high purity to ring-opening polymerization.

In order to synthesize a copolymer as the polyglycolic acid, it is only necessary to copolymerize glycolide, glycolic acid or an alkyl glycolate in suitable combination with comonomers, for example, cyclic monomers such as ethylene oxalate, lactide, lactones (for example, β-propiolactone, β-butyrolactone, pivalolactone, γ-butyrolactone, δ-valerolactone, β-methyl-δ-valerolactone and ε-caprolactone), trimethylene carbonate and 1,3-dioxane; hydroxycarboxylic acids such as lactic acid, 3-hydroxypropanoic acid, 3-hydroxybutanoic acid, 4-hydroxy-butanoic acid and 6-hydroxycaproic acid, and alkyl esters thereof; substantially equimolar mixtures of an aliphatic diol such as ethylene glycol or 1,4-butanediol and an aliphatic dicarboxylic acid such as succinic acid or adipic acid or an alkyl ester thereof; and two or more compounds thereof. The proportion of the comonomer(s) is a proportion of preferably at most 40% by weight, more preferably at most 20% by weight, particularly preferably at most 10% by weight.

The oxygen gas transmission coefficient of the polyglycolic acid used in the present invention is preferably $5.0 \times 10^{-14}$ cm$^3$·cm/cm$^2$·sec·cmHg or lower as measured at a temperature of 23° C. and a relative humidity (RH) of 80% in accordance with JIS K-7126. If the oxygen gas transmission coefficient of the polyglycolic acid is too high, it is difficult to provide a multilayer blow molded container excellent in oxygen gas barrier property. The oxygen gas transmission coefficient of the polyglycolic acid used in the present invention is often within a range of $1.0 \times 10^{-14}$ to $5.0 \times 10^{-14}$ cm$^3$·cm/cm$^2$·sec·cmHg.

The melt viscosity (measured at a temperature of 270° C. and a shear rate of 122 sec$^{-1}$) of the polyglycolic acid used in the present invention is 300 to 900 Pa·s, preferably 330 to 900 Pa·s, more preferably 350 to 900 Pa·s. The lower limit value of the melt viscosity of the polyglycolic acid may be defined as 400 Pa·s or 50 Pa·s. The upper limit value of the melt viscosity of the polyglycolic acid may be defined as 700 Pa·s or 650 Pa·s.

If the melt viscosity of the polyglycolic acid as measured at a temperature of 270° C. and a shear rate of 122 sec$^{-1}$ is too low, a hold-over phenomenon that a polyglycolic acid layer forming a core layer is cleaved into plural layers is liable to occur when co-injection molding is conducted together with a thermoplastic polyester resin having a relatively high melt viscosity. When the core layer, which will become a gas barrier layer, is cleaved into 2 or more layers, it is difficult to uniformly control the thickness of the core layer. In a PET bottle or the like, it is generally desirable from the viewpoints of mechanical strength, reduction in cost and the like to thin the thickness of a core layer, which will become a gas barrier layer. However, when a thin core layer is cleaved into 2 or more layers, it is difficult to stably perform co-injection molding. In addition, the thickness unevenness of the respective layers cleaved also becomes great.

When the polyglycolic acid too low in melt viscosity is subjected to co-injection molding in combination with a thermoplastic polyester resin having a low melt viscosity, the phenomenon that the core layer is cleaved into plural layers can be prevented. However, the mechanical strength of the resulting multilayer blow molded container is lowered because the molecular weight of the thermoplastic polyester resin becomes low.

If the melt viscosity of the polyglycolic acid as measured at a temperature of 270° C. and a shear rate of 122 sec$^{-1}$ is too high, it is difficult to uniformly control the thickness of the resulting polyglycolic acid layer unless the injection temperature of the polyglycolic acid is preset to a high temperature of 255° C. or higher. When the injection temperature of the polyglycolic acid is preset to a high temperature, the polyglycolic acid remaining in an injection molding machine tends to cause thermal decomposition though the thickness of the resulting polyglycolic acid layer can be easily controlled. As a result, the appearance and gas barrier properties of the resulting multilayer blow molded container are impaired.

On the other hand, when the injection temperature of the polyglycolic acid high in melt viscosity is preset to a low temperature, it is difficult to uniformly control the polyglycolic acid layer, which will become a core layer, in the co-injection molding. In general, the thickness of the polyglycolic acid layer at each body in the multilayer preform and multilayer blow molded container obtained by the co-injection molding shows a tendency to become thinner as the body comes nearer to a lower portion (bottom) from an upper portion (a portion near to an opening end portion; neck portion) (see FIGS. 1 and 2). If the melt viscosity of the polyglycolic acid is too high, the thickness of the polyglycolic acid layer in the vicinity of the bottom at the body of the multilayer preform becomes markedly small. Therefore, the gas barrier properties in the vicinity of the bottom at the body of a multilayer blow molded container obtained by the stretch blow molding of such a multilayer preform become insufficient. Such a tendency becomes stronger as the volume of the multilayer preform becomes smaller, or the amount of the polyglycolic acid filled is made smaller for thinning the core layer.

The melting point Tm of the polyglycolic acid used in the present invention is preferably 200° C. or higher, more preferably 210° C. or higher. The melting point of a homopolymer of glycolic acid is about 220° C.

In the present invention, a neat resin of the polyglycolic acid may be used by itself. However, a resin composition obtained by incorporating inorganic fillers, other thermoplastic resins, plasticizers and the like into the polyglycolic acid within limits not impeding the object of the present invention may also be used. Various additives such as heat stabilizers, light stabilizers, moistureproofing agents, waterproofing agents, lubricants, pigments and dyes may be contained in the polyglycolic acid as needed.

When a polyglycolic acid, to which a heat stabilizer has been added, is used in particular, melt stability in the co-injection molding is improved, and variations of the melt viscosity and thermal decomposition are hard to occur. Accordingly, the melt viscosity ratio x/y between the polyglycolic acid and the thermoplastic polyester resin can be easily controlled by using the polyglycolic acid containing the heat stabilizer, and so a desired multilayer blow molded container can be easily molded. As the heat stabilizer, may be mentioned at least one compound selected from the group consisting of heavy metal deactivators, phosphates having a pentaerythritol skeleton structure, phosphorus compounds having at least one hydroxyl group and at least one long-chain alkyl ester group, and metal carbonates.

Many of phosphorus compounds such as phosphite antioxidants rather exhibit an effect to inhibit the melt stability of the polyglycolic acid. On the other hand, the phosphates having a pentaerythritol skeleton structure represented by the following formula (2):

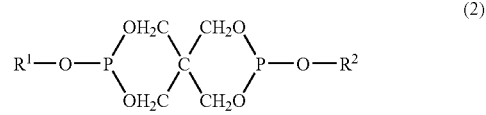

(2)

wherein R$^1$ and R$^2$ are hydrocarbon groups that are the same or different from each other, exhibit an effect to specifically improve the melt stability of the polyglycolic acid.

Examples of R$^1$ and R$^2$ include aryl groups (preferably, a phenyl group) substituted by 1 to 3 alkyl group (having 1 to 12 carbon atoms, preferably 1 to 4 carbon atoms). Specific examples thereof include a 2,6-di-tert-butyl-4-methylphenyl group and a 2,4-di-tert-butylphenyl group. In other words, specific examples of such phosphates having a pentaerythritol skeleton structure include cyclic neopentanetetraylbis(2,6-di-tert-butyl-4-methyl-phenyl)phosphite and cyclic neopentanetetraylbis(2,4-di-tert-butylphenyl)phosphite. Examples of R$^1$ and R$^2$ also include long-chain alkyl groups (for example, an octadecyl group) having 8 to 24 carbon atoms.

As the phosphorus compounds having at least one hydroxyl group and at least one long-chain alkyl ester group are preferred phosphorus compounds represented by the formula (3):

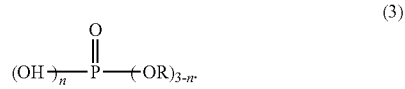

(3)

Wherein R is a long-chain alkyl group, and n is 1 or 2. As the long-chain alkyl group, is preferred an alkyl group (for example, an octadecyl group=a stearyl group) having 8 to 24 carbon atoms. Specific examples of such phosphorus compounds include mono- or di-stearyl acid phosphate.

Examples of the heavy metal deactivators include 2-hydroxy-N-1H-1,2,4-triazol-3-yl-benzamide and bis[2-(2-hydroxybenzoyl)hydrazin]dodecanediacid. Examples of the metal carbonates include calcium carbonate and strontium carbonate.

A proportion of these heat stabilizer incorporated is generally 0.001 to 5 parts by weight, preferably 0.003 to 3 parts by weight, more preferably 0.005 to 1 part by weight per 100 parts by weight of the polyglycolic acid. The heat stabilizer is preferably that having an effect to improve the melt stability even by the addition in an extremely small amount. If the amount of the heat stabilizer incorporated is too great, the effect is saturated, or there is a possibility that the transparency may be impaired.

2. Thermoplastic Polyester Resin

As examples of the thermoplastic polyester resin used in the present invention, may be mentioned thermoplastic polyester resins other than the polyglycolic acid. Among others, thermoplastic aromatic polyester resins each composed mainly of an aromatic dicarboxylic acid or its alkyl ester and glycol are preferred.

Examples of the thermoplastic aromatic polyester resin include polyethylene terephthalate (PET), non-crystalline polyethylene terephthalate copolymers (PETG) containing 1,4-cyclohexanedimethanol as a copolymerizable component, polyethylene naphthalate (PEN), polybutylene terephthalate (PBT), poly-1,4-cyclohexylene-dimethylene terephthalate-isophthalate copolymers (PCTA), and mixtures of two or more thereof.

In PET, a copolyester (Co-PET) with a part of the acid component replaced by isophthalic acid or naphthalenedicarboxylic acid, or a copolyester with a part of the glycol component replaced by a particular diol such as diethylene glycol may be used.

Among the thermoplastic polyester resins, polyethylene terephthalate or a copolyester (Co-PET) containing a polyethylene terephthalate component in a proportion of 90 mol % or higher is preferred.

The inherent viscosity (IV value) of the thermoplastic polyester resin is generally 0.5 to 1.5 dl/g, preferably 0.6 to 1.0 dl/g, more preferably 0.7 to 0.85 dl/g. The IV value of the thermoplastic polyester resin is a value (unit=dl/g) obtained by dissolving a resin at a concentration of 0.5% by weight in o-chlorophenol or a mixed solvent of phenol/chloroethane (60/40% by weight) and measuring a viscosity at 30° C. using Canon Ubbelohde Type 1B Viscometer in accordance with ASTM D4603-96.

The melt viscosity of the thermoplastic polyester resin is preferably 250 to 600 Pa·s, more preferably 300 to 550 Pa·s, particularly preferably 350 to 500 Pa·s as measured at a temperature of 290° C. and a shear rate of 122 sec$^{-1}$. The melt viscosity y of the thermoplastic polyester resin used in the present invention is selected so as to satisfy the relationship that a melt viscosity ratio x/y with the melt viscosity x of the polyglycolic acid, which will be described in detail subsequently, is 0.85 to 1.80, preferably 0.85 to 1.75.

The thermoplastic polyester resin may contain various additives such as inorganic fillers, plasticizers, other thermoplastic resins, heat stabilizers, light stabilizers, moisture-proofing agents, waterproofing agents, water repellent agents, lubricants, releasing agents, coupling agents, pigments and dyes as needed. A small amount (for example, 10% by weight or smaller) of regrind of multilayer blow molded containers may also be mixed. Quite naturally, regrind of single-layer PET bottles may be mixed.

3. Melt Viscosity Ratio x/y

The polyglycolic acid and thermoplastic polyester resin used in the present invention satisfy the relationship of the specific melt viscosity ratio. More specifically, when the melt viscosity of the polyglycolic acid as measured at a temperature of 270° C. and a shear rate of 122 sec$^{-1}$ is regarded as x (Pa·s), and the melt viscosity of the thermoplastic polyester resin as measured at a temperature of 290° C. and a shear rate of 122 sec$^{-1}$ is regarded as y (Pa·s), a ratio x/y of the melt viscosity x of the polyglycolic acid to the melt viscosity y of the thermoplastic polyester resin is 0.85 to 1.80, preferably 0.85 to 1.75, more preferably 0.85 to 1.70. The melt viscosity ratio x/y is preferably 0.85 to 1.75, more preferably 0.88 to 1.70 from the viewpoint of co-injection moldability. The melt viscosity of the polyglycolic acid is made high, whereby a multilayer preform with a polyglycolic acid layer having a uniform thickness embedded in a thermoplastic polyester resin layer, in turn, a multilayer blow molded container can be obtained by co-injection molding.

In the co-injection molding, the thickness of the polyglycolic acid layer forming the core layer can be controlled to some extent by an injection speed and a stroke length upon the injection molding. However, the melt viscosities of the polyglycolic acid and thermoplastic polyester resin are also factors affecting the thickness. If the melt viscosity of the polyglycolic acid to the melt viscosity of the thermoplastic polyester resin is too high, a resin drag called a trailing edge becomes long, so that it is difficult to control the thickness of the polyglycolic acid layer. If the melt viscosity of the polyglycolic acid to the melt viscosity of the thermoplastic polyester resin is too low on the other hand, the hold-over phenomenon that the polyglycolic acid layer is cleaved into plural layers is liable to occur.

In general, when the melt viscosity ratio x/y falls within a preferable range of 0.85 to 1.75, the thickness of the polyglycolic acid layer at the body can be uniformly controlled even when the volume of the multilayer preform and/or the amount of the polyglycolic acid filled are small. The gas barrier properties of the body of the multilayer blow molded container (bottle) are greatly affected by the thickness of the polyglycolic acid layer. The gas barrier properties of the whole bottle can be highly retained at the opening end portion (neck portion) and bottom of the bottle because the thickness of the thermoplastic polyester resin layer is great even when no polyglycolic acid layer is present, or the thickness thereof is extremely thin.

When the melt viscosity of the polyglycolic acid is 300 to 900 Pa·s, and the melt viscosity ratio x/y is 0.85 to 1.80, preferably 0.85 to 1.75, more preferably 0.85 to 1.70, the thickness of the polyglycolic acid layer can be easily controlled, and other molding properties are also excellent even when the injection temperature of the polyglycolic acid are controlled to a temperature lower than 255° C. The other molding properties include inconspicuous disorder of weld-line, inconspicuous flow mark at a bottle support ring portion (opening end portion) upon stretch blow molding and inhibition of thermal decomposition of a resin remaining in an injection molding machine.

The melt viscosities of the respective resins are desirably selected on the basis of shear rates and resin temperatures at the time the polyglycolic acid and the thermoplastic polyester resin meet each other within a nozzle of a mold for molding a preform. However, it is difficult to exactly measure actual shear rates and resin temperatures upon co-injection molding. On the other hand, it is easy to control and specify the melt viscosity ratio x/y, and a melt viscosity ratio x/y of 0.85 to 1.80, preferably 0.85 to 1.75, more preferably 0.85 to 1.70 is selected, whereby co-injection moldability mainly including the control of the thickness of the polyglycolic acid layer can be markedly improved.

If the melt viscosity ratio x/y is too high, the trailing edge is liable to become long, so that it is difficult to control the thickness of the polyglycolic acid layer, and a flow mark is liable to occur at the neck portion of the resulting bottle. If the melt viscosity ratio x/y is too low, the hold-over is liable to occur. If the melt viscosities of the respective resins are too low, the mechanical strength of the resulting multilayer blow molded container is deteriorated. It is thus preferable to select a polyglycolic acid and a thermoplastic polyester resin each having a high melt viscosity within limits not impeding the moldability if possible.

4. Co-injection Stretch Blow Molding

In the present invention, the polyglycolic acid and the thermoplastic polyester resin are co-injected to form a bottomed multilayer preform, and the multilayer preform is then subjected to stretch blow molding to produce a multilayer blow molded container. The stretch blow molding is generally biaxial stretch blow molding.

In the step of producing the multilayer preform, a molding machine equipped with a plurality of injection cylinders is used to co-inject the respective resin melts through one gate into a cavity of a single mold for preform in one clamp operation. By the co-injection molding process, a bottomed multilayer preform, in which an inner layer and an outer layer are layer of the thermoplastic polyester resin, a core layer formed of a polyglycolic acid layer is embedded in between the thermoplastic polyester resin layers, an opening end portion is formed of a thermoplastic resin layer alone, and a body has a three-layer structure, is obtained. No polyglycolic acid layer may be present at a part or the whole of the bottom of the multilayer preform. Since the thickness of the bottom is generally great compared with the thickness of the body, the gas barrier properties can be exhibited even when the bottom is substantially formed of the thermoplastic polyester resin layer alone. In general, the mechanical strength shows a tendency to lower when a gas barrier layer is present at the bottom of a bottle. Further, a polyglycolic acid layer is arranged in the body alone, whereby the thickness of such a polyglycolic acid layer can be uniformly controlled with ease.

Figure 3:
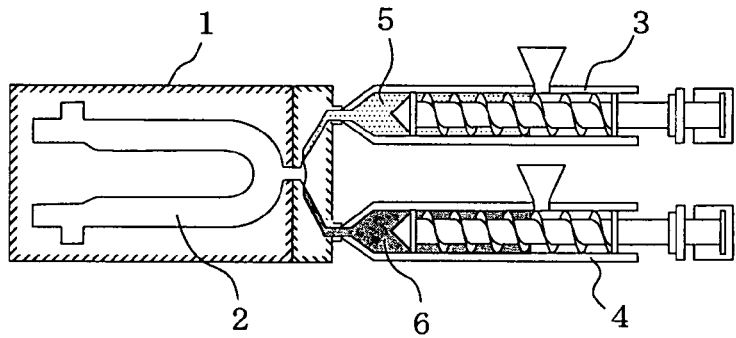
FIG. 3 illustrates a co-injection molding process.
Figure 4:
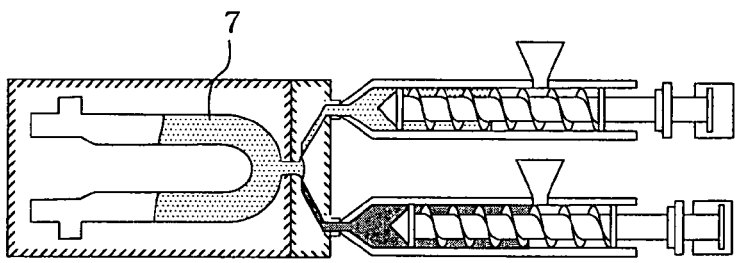
FIG. 4 illustrates the co-injection molding process.

A specific example of a specified co-injection molding process, which can be suitably adopted in the present invention, is illustrated in FIGS. 3 to 6. First, a part of a thermoplastic polyester resin 5 is injected from an injection cylinder 3 into a cavity 2 of a mold 1 (FIGS. 3 and 4). In this case, the amount of the resin partially injected is preferably about 10 to 60 percent of the volume of the cavity. By the partial injection of the thermoplastic polyester resin, an opening end portion of a multilayer preform is formed by the thermoplastic polyester resin alone, whereby a polyglycolic acid layer (core layer) can be prevented from being exposed from the opening end portion.

Figure 5:
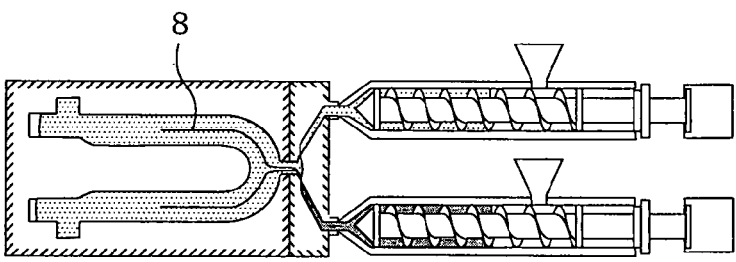
FIG. 5 illustrates the co-injection molding process.

Polyglycolic acid 6 is then injected from another injection cylinder 4 while injecting the thermoplastic polyester resin 5 from the injection cylinder 3, thereby forming a polyglycolic acid layer 8 in a thermoplastic polyester resin 7 held in a molten state in the cavity 2 (FIG. 5). The amount of the thermoplastic polyester resin and polyglycolic acid injected in this step is an amount sufficient to almost completely fill the internal volume of the cavity in total with the amount of the thermoplastic polyester resin partially injected.

Figure 6:
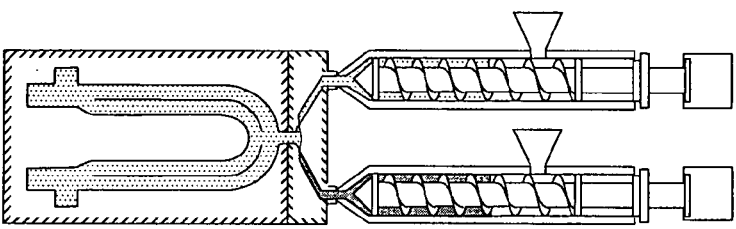
FIG. 6 illustrates the co-injection molding process.

Finally, the thermoplastic polyester resin 5 alone is injected again from the injection cylinder 3 to fill up the mold cavity entirely, thereby obtaining a multilayer preform with its bottom sealed with the thermoplastic polyester resin (FIG. 6). By this step, a multilayer preform, in which the length of a trailing edge by the polyglycolic acid layer previously injected is suppressed, and the bottom is formed by the thermoplastic polyester resin alone, is formed.

Figure 7:
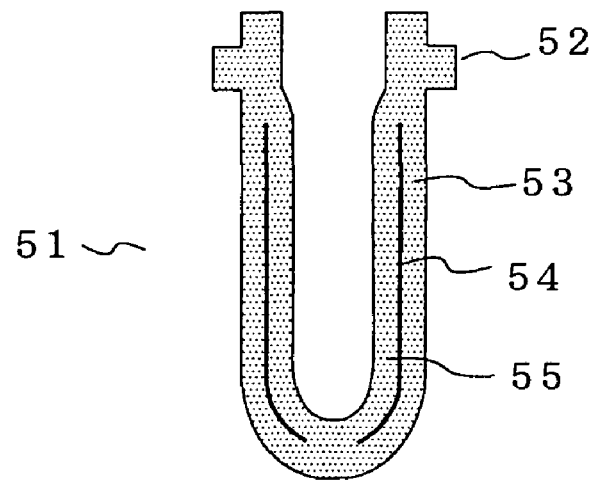
FIG. 7 is a cross-sectional view illustrating the form and layer structure of a multilayer preform.

According to the co-injection molding process composed of a combination of a successive molding process and a concurrent molding process, a multilayer preform of a layer structure illustrated in FIG. 7 can be obtained. In this multilayer preform, the polyglycolic acid layer of a core layer is completely embedded in the thermoplastic polyester resin layer, and so the lowering of gas barrier properties by exposure of the core layer and occurrence of interlayer separation are prevented. On the other hand, it is necessary to uniformly control the thickness of the polyglycolic acid layer by shortening the trailing edge of the polyglycolic acid layer upon the co-injection molding. In the present invention, production conditions such as the melt viscosity of the polyglycolic acid, the melt viscosity ratio x/y and the injection temperature of the polyglycolic acid are controlled, whereby the trailing edge can be shortened, and a scatter of thickness of the polyglycolic acid layer can be reduced. A multilayer blow molded container inconspicuous in weldline at a junction of the resins and flow mark at the opening end portion can also be obtained by these production conditions.

In the production process according to the present invention, the injection temperature (hot runner temperature) of the polyglycolic acid in the co-injection molding is controlled to a temperature (barrel temperature lower than 250° C.) lower than 255° C., preferably 250° C. or lower, more preferably 245° C. or lower, whereby the thermal decomposition of the polyglycolic acid remaining in the injection molding machine can be inhibited. In other words, co-injection molding excellent in heat stability becomes feasible. The lower limit of the injection temperature of the polyglycolic acid is generally 200° C., preferably 210° C., more preferably 220° C. A particularly preferable injection temperature of the polyglycolic acid is higher than 220° C., but not higher than 240° C. When the injection temperature of the polyglycolic acid is high, the thermal decomposition of the residual resin is accelerated. Therefore, it is not preferable to adopt a process in which a polyglycolic acid having a too high melt viscosity is injected at a high temperature of 255° C. or higher.

When the thermoplastic polyester resin is PET or Co-PET, the resin temperature upon the co-injection molding is generally 265 to 300° C., preferably 270 to 295° C. If the injection temperature of the thermoplastic polyester resin is too low, melt flowability becomes too poor, so that it is difficult to obtain a multilayer preform of a three-layer structure that the thermoplastic polyester resin forms inner and outer layers. If the injection temperature of the thermoplastic polyester resin is too high, thermal decomposition is liable to occur.

As illustrated in FIG. 7, the multilayer preform 51 is formed from an opening end portion (mouth portion) 52, an outer layer 53 of the thermoplastic polyester resin, a core layer 54 of the polyglycolic acid and an inner layer 55 of the thermoplastic polyester resin. A part or the whole of the bottom of the multilayer preform is formed of the thermoplastic polyester resin alone by the last injection of the thermoplastic polyester resin in the co-injection molding.

The proportions of the thermoplastic polyester resin and polyglycolic acid used may be suitably determined in view of a balance between desired gas barrier properties and mechanical strength, heat resistance or the like. The proportion of the thermoplastic polyester resin used is preferably 85 to 99% by weight, more preferably 90 to 98% by weight, and the proportion of the polyglycolic acid used is preferably 1 to 15% by weight, more preferably 2 to 10% by weight.

In the multilayer preform, the opening end portion (a portion corresponding to a neck portion of a container) is preferably subjected to a heat treatment to crystallize the thermoplastic polyester resin layer. The opening end portion of the bottomed multilayer preform has a single-layer structure substantially composed of the thermoplastic polyester resin, and heat resistance and gas barrier properties are not always sufficient. Therefore, it is desirable that the opening end portion of the multilayer preform is heated to about 200° C. by, for example, infrared rays before the multilayer preform is subjected to stretch blow molding, thereby crystallize the end portion. The crystallinity of the thermoplastic polyester resin at the opening end portion after the crystallization is generally 25% by volume or greater, preferably 30% by volume or greater.

It may also be possible to adopt a process in which a resin having a high glass transition temperature, such as a polycarbonate or polyallylate resin, is injection-molded into a mouth piece, and this mouth piece is insert-molded into the opening end portion of the multilayer preform, thereby improving the heat resistance of the mouth of the multilayer container.

The multilayer preform is then subjected to stretch blow molding. In the stretch blow molding step, the multilayer preform is regulated to a temperature at which the preform is stretchable, and then inserted into a cavity of a mold for blow molding to conduct stretch blow molding by blowing a pressurized fluid such as air therein. The stretch blow molding may be conducted by either a hot-parison method or a cold-parison method. It is generally preferable from the viewpoint of temperature control to adopt the cold-parison method. Here, the parison means a preform.

In order to subject a multilayer preform having outer and inner layers formed of thermoplastic polyester resin layers and a core layer formed of a polyglycolic acid layer to stretch blow molding by the cold-parison method, the multilayer preform is first heated by an infrared heater or the like until the preform is sufficiently softened. By this heating step, the thermoplastic polyester resin layers are softened while retaining a non-crystalline state. However, the polyglycolic acid layer is crystallized and whitened. If the crystallization of the polyglycolic acid layer is uneven at this time, the thickness unevenness of the polyglycolic acid layer after the stretch blow molding becomes great, and defects are liable to occur. Therefore, it is necessary to evenly crystallize the polyglycolic acid layer. In particular, if the crystallization of the polyglycolic acid at a weldline is insufficient, racks are liable to occur upon the stretch blow molding.

In order to evenly crystallize the polyglycolic acid layer, it is preferable to heat the multilayer preform to a temperature of 90° C. or higher. More specifically, heater power and heating time are controlled in such a manner that the surface temperature of the thermoplastic polyester resin layer (outer layer) at a central portion in a longitudinal direction of the multilayer preform is 90 to 110° C. However, the temperature in the vicinity of the mouth (a portion where a support ring is present) of the multilayer preform is preferably preset so as to become lower by 10 to 30° C. than the surface temperature at the central portion for the purpose of avoiding deformation upon the stretch blow molding. When the temperature in the vicinity of the mouth (support ring) is lowered, the stretchability of the polyglycolic acid layer at that portion is lowered, and voids and cracks are liable to occur. However, when the sizes of the multilayer preform and the resulting bottle are preset in such a manner that a stretch factor in a lateral direction at a position 2 cm away downward from the support ring (outer diameter of the portion 2 cm away downward from the support ring after formation of the bottle/outer diameter of the portion 2 cm away downward from the support ring of the multilayer preform) is 2 times or lower, the voids and cracks in the vicinity of the mouth can be inhibited. Here, the support ring means a ring for holding the mouths of the multilayer preform and the multilayer blow molded container.

After the preheating, a pressurized fluid such as compressed air is blown in the bottomed multilayer preform heated to a stretch temperature for expansion and stretching. In general, the stretch factor is of the order of 1.5 to 3 times in an axial direction and 3 to 5 times in a circumferential direction. Although somewhat varying according to the kinds of stretch blow molded containers (blow molded bottles), the blow-up ratio (total stretch factor) is of the order of 6 to 9 times for general-purpose blow molded bottles, 8 to 9.5 times for pressure bottles, 6 to 7.5 times for heat-resistant bottles, and 7 to 8 times for large bottles.

When the thermoplastic polyester resin is PET, compressed air is blown in the multilayer preform at a temperature ranging from the glass transition temperature thereof to the crystallization temperature, preferably at a temperature of 80 to 170° C. At that time, a stretching rod is inserted to biaxially stretching the multilayer preform in the axial (longitudinal) and circumferential (lateral) directions. The glass transition temperature of the polyglycolic acid forming the core layer is about 38° C., and so the polyglycolic acid layer is easily stretched following the stretching of the thermoplastic polyester resin that forms the inner and the outer layers.

In the stretch blow molding step, it is preferred that the mold be heated to a temperature of 100° C. or higher to thermally fix the body of the biaxially oriented multilayer container at the same time as the stretch blow molding. The biaxially oriented state is thermally fixed by the heat treatment in the mold heated to the high temperature and, at the same time, the crystallization of the thermoplastic polyester resin layers progresses. By the heat treatment, internal distortion resulting from the stretch blow molding step is relaxed, and orientation and crystallization are promoted. Unlike large spherulites created by the heat treatment of the opening end portion, transparency is retained at the body even when the orientation and crystallization are promoted. The crystallinity of the body sidewall after the thermal fixation is usually 28% by volume or higher.

When PET or Co-PET is used as the thermoplastic polyester resin in particular, the thermal fixation is desirably conducted in that heat resistance is improved. When a multilayer blow molded container having heat resistance fit for hot-filling is produced, the mold for stretch blow molding is heated to a temperature of 100° C. or higher to conduct the heat treatment (thermal fixation) in the mold at the same time as the stretch blow molding for the purpose of preventing thermal shrinkage and deformation of the container at the time of hot-filling. More specifically, the mold is preferably heated to a temperature within a range of 100 to 165° C., 145 to 155° C. for general-purpose heat-resistant containers or 160 to 165° C. for highly heat-resistant containers. Although varying according to the thickness of multilayer containers and the heat treatment temperature applied, the heat treatment is conducted for generally 1 to 30 seconds, preferably 2 to 20 seconds.

As a method for conducting the heat treatment in the mold, a single-stage molding method in which stretch blow molding and thermal fixation are conducted in a single mold, a two-stage blow method in which a multilayer blow molded container subjected to primary stretch blow molding is taken out of a mold and thermally fixed, and then subjected to secondary stretch blow molding in a secondary mold, or an oven blow method may be suitably applied. When the heat treatment is conducted at the time of stretch blow molding, the resultant multilayer blow molded container is taken out of the mold after fully cooled.

5. Multilayer Blow Molded Container

The multilayer blow molded container according to the present invention is a multilayer blow molded container having a three-layer structure that a single polyglycolic acid layer is provided as a core layer, and thermoplastic polyester resin layers are arranged on both surfaces of the core layer. The multilayer blow molded container according to the present invention is obtained by forming a multilayer preform by co-injection molding and then subjecting the multilayer preform to biaxial stretch blow molding and may be called a co-injection multilayer stretch blow molded container.

Figure 8:
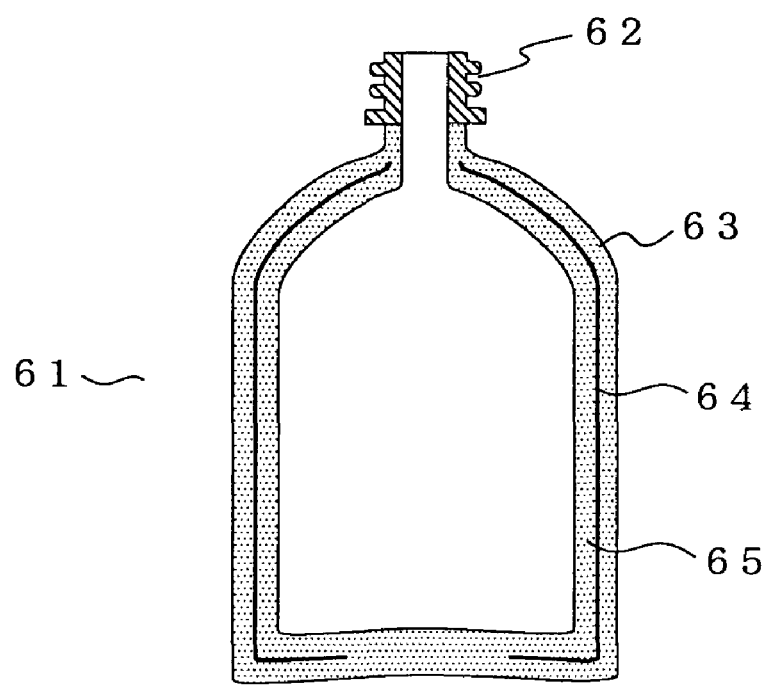
FIG. 8 is a cross-sectional view illustrating the form and layer structure of a multilayer blow molded container.

As illustrated in FIG. 8, the multilayer blow molded container 61 according to the present invention is formed from an opening end portion (neck portion) 62, an outer layer 63 of the thermoplastic polyester resin, a core layer 64 of the polyglycolic acid and an inner layer 65 of the thermoplastic polyester resin. The opening end portion is formed by the thermoplastic polyester resin layer alone. A part or the whole of the bottom of the container is formed by the thermoplastic polyester resin layer alone. There is no need of arranging an adhesive layer between the polyglycolic acid layer and the thermoplastic polyester resin layer because the core layer formed of the polyglycolic acid layer is embedded in between the thermoplastic polyester resin layers.

The thickness of the total layers that form the body (side wall) of the multilayer blow molded container may properly be determined depending as necessary for the end application intended. However, the total thickness is of the order of generally 100 μm to 5 mm, preferably 150 μm to 3 mm, more preferably 300 μm to 2 mm.

In the case of a multilayer blow molded container of which heat resistance or heat resistance and pressure resistance are required, the thickness of a body thereof is made greater. For example, a heat-resistant bottle or heat-resistant and pressure-resistant bottle of 1.5 liters has a weight of the order of 50 to 60 g. On the other hand, an aseptic packing bottle may have a thin body because of being filled up at normal temperature and pressure, and a bottle of 1.5 liters may have a weight of 40 to 50 g.

The total thickness of the thermoplastic polyester resin layers at the body is of the order of generally 50 μm to 4.5 mm, preferably 100 μm to 2.5 mm, more preferably 200 μm to 1 mm. The thickness of the core poly-glycolic acid layer at the body is generally 5 μm or greater, preferably 5 to 200 μm, more preferably 10 to 100 μm. The polyglycolic acid layer is preferably arranged somewhat outside of the central portion because what is filled is often an aqueous fluid.

As illustrated in FIG. 1, the multilayer preform obtained by the co-injection molding shows a tendency for the thickness of the polyglycolic acid layer at the body thereof to become thinner as it goes toward the bottom from the mouth portion (support ring) thereof. The thickness of the body becomes thinnest in the vicinity of the bottom. The multilayer preform (Example 1) obtained by the production process according to the present invention shows a tendency for the thickness of the polyglycolic acid layer (PGA layer) at the body to become thinner. However, the tendency is markedly lightened compared with the case (Comparative Example 1) where a polyglycolic acid having a too high melt viscosity was used. On the other hand, when the polyglycolic acid having a melt viscosity as high as 1,000 Pa·s as measured at a temperature of 270° C. and a shear rate of 122 sec$^{-1}$ was used (Comparative Example 1), a tendency for the thickness of the polyglycolic acid layer at the body to become thinner is strong. In particular, the thickness of the polyglycolic acid layer at the body in the vicinity of the bottom is extremely thin.

Figure 2:
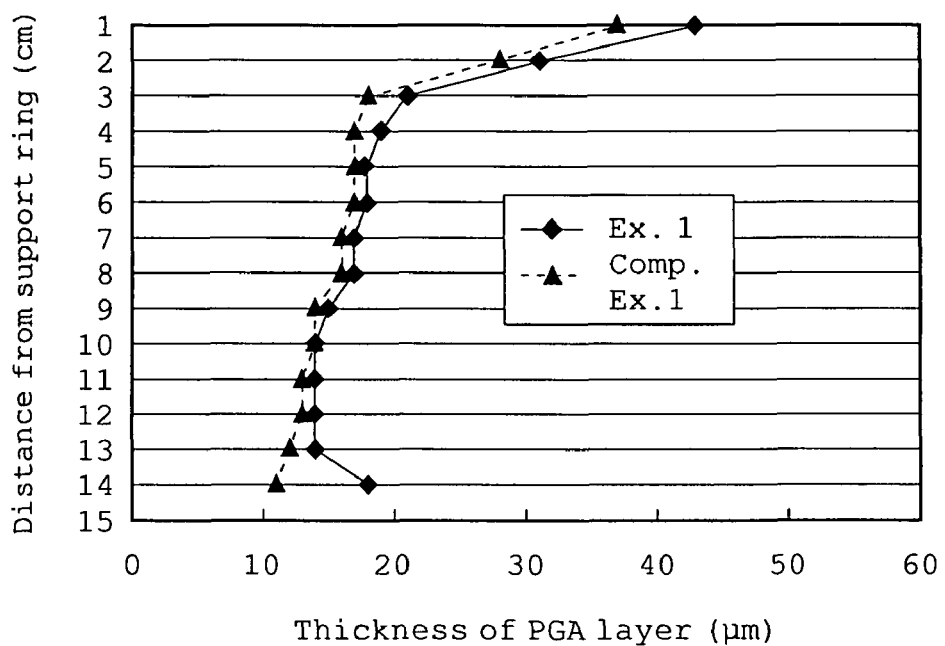
FIG. 2 is a graph illustrating thickness distributions at the bodies of respective multilayer blow molded containers obtained in Example 1 and Comparative Example 1.

The results of the production of stretch blow molded containers using these multilayer preforms are illustrated in FIG. 2. As apparent from FIG. 2, the multilayer blow molded container (Example 1) obtained by the production process according to the present invention shows a tendency for the thickness of the polyglycolic acid layer (PGA layer) at the body to become thinner. However, the tendency is markedly lightened compared with the case (Comparative Example 1) where the polyglycolic acid having a too high melt viscosity was used. A thickness of the polyglycolic acid layer at the body in the vicinity of the bottom is comparable with the thickness of the polyglycolic acid layer at the center of the body. In the multilayer blow molded container according to Comparative Example 1, the thickness of the polyglycolic acid layer at the body in the vicinity of the bottom is considerably thin. It is hence apparent that the gas barrier properties of the whole container are adversely affected.

In the multilayer preform and multilayer blow molded container obtained by the production process according to the present invention, the disorder of the weldline is little, and the flow mark at the neck portion is inconspicuous in addition to a narrow scatter of thickness of the core layer formed of the polyglycolic acid. The multilayer blow molded container according to the present invention is excellent in a balance among properties such as gas barrier properties, heat resistance and mechanical strength.

EXAMPLES

The present invention will hereinafter be described more specifically by the following Examples and Comparative Examples.

Various physical properties and other properties are measured and evaluated as follows.

(1) Melt Viscosity

Dry pellets were used to measure a melt viscosity of polyglycolic acid at a temperature of 270° C. and a shear rate of 122 sec$^{-1}$ by means of CAPILLOGRAPH 1C (die=1 mm in diameter×10 mm in length) manufactured by Toyo Seiki Seisakusho, Ltd. Likewise, a melt viscosity of a thermoplastic polyester resin was measured at a temperature of 290° C. and a shear rate of 122 sec$^{-1}$.

(2) Oxygen Gas Transmission Coefficient

Measurement was carried out under conditions of a temperature of 23° C. and a relative humidity of 80% by means of OXTRAN 2/20 manufactured by Modern Controls Inc. in accordance with JIS K-7126.

(3) Oxygen Transmission Rate of Multilayer Blow Molded Container

Using a multilayer blow molded container having a volume of 350 ml, an oxygen transmission rate of the multilayer container was measured at a measurement temperature of 23° C. by means of OXTRAN-100 manufactured by Modern Controls Inc. while the inside of the container was kept at 100% RH (relative humidity) and the outside at 65% RH.

(4) Controllability of Thickness

A multilayer preform was visually observed to make evaluation as to the controllability of thickness in accordance with the following standard.

A: A trailing edge is hard to occur, and it is easy to control the thickness;
B: A trailing edge is somewhat observed, and it is somewhat difficult to control the thickness;
C: A trailing edge is easy to occur, and it is difficult to control the thickness.

(5) Weldline

A multilayer preform was visually observed to make evaluation as to the disorder of weldline in accordance with the following standard.

A: The disorder of weldline is inconspicuous;
B: The disorder of weldline is observed;
C: The disorder of weldline is conspicuous.

(6) Flow Mark

A multilayer preform was visually observed to make evaluation as to flow mark in accordance with the following standard.

A: Flow mark at a support ring portion of a bottle is inconspicuous;
B: Flow mark is observed;
C: Flow mark is conspicuous.

(7) Thermal Decomposition of Polyglycolic Acid

Injection molding of polyglycolic acid is continuously conducted, injection was stopped for 29 minutes while retaining the same injection temperature at the time coloring was observed on a polyglycolic acid layer, and the injection was then started again to count the number of shots required to cause the coloring of the polyglycolic acid to vanish, thereby making evaluation in accordance with the following standard.

AA: The coloring vanishes within 5 shots;
A: The coloring vanishes between 6 and 10 shots;
B: The coloring vanishes between 11 to 20 shots;
C: Shots more than 20 shots are required for vanishing of the coloring.

(8) Thickness Distribution of Polyglycolic Acid Layer

After a multilayer preform was cooled, a body portion was cut out, thermoplastic polyester resin layers and a polyglycolic acid layer were separated from each other, and the thickness of the polyglycolic acid layer was measured along a vertical direction. With respect to a multilayer blow molded container as well, the thickness distribution of the polyglycolic acid layer was measured likewise.

Example 1

A polyglycolic acid homopolymer (ring-opening polymer of glycolide) having a melt viscosity of 598 Pa·s as measured at a temperature of 270° C. and a shear rate of 122 sec$^{-1}$ was used as polyglycolic acid (PGA). This polyglycolic acid had an oxygen gas transmission coefficient of $2.5 \times 10^{-14}$ cm$^3$·cm/cm$^2$·sec·cmHg. A copolyester (Co-PET; 1101 produced by Kosa) having an IV value of 0.83 dl/g and a melt viscosity of 396 Pa·s as measured at a temperature of 290° C. and a shear rate of 122 sec$^{-1}$ was used as a thermoplastic polyester resin.

This polyglycolic acid was used in a proportion of 4% by weight based on the whole resin component to conduct co-injection molding together with the Co-PET by controlling the injection temperature (hot runner temperature) of the Co-PET that forms as inner and outer layers and the injection temperature (hot runner temperature) of the polyglycolic acid to 290° C. and 235° C., respectively, by a co-injection molding machine (IN90) manufactured by Kortec Inc., thereby producing a multilayer preform having a weight of 20 g.

More specifically, a part of the Co-PET was first injected, the Co-PET and the polyglycolic acid were then injected at the same time, and only the Co-PET was finally injected. The core layer of a body in the multilayer preform was formed of the polyglycolic acid layer, and the Co-PET layers were arranged on inner and outer surfaces of the core layer. The opening end portion and the bottom of the multilayer preform were formed by the Co-PET layer alone. The evaluation results of this multilayer preform are shown in Table 1. With respect to this multilayer preform, the thickness distribution of the polyglycolic acid layer in a vertical direction is shown in FIG. 1.

A blow molding machine (trade name "SBO-1/2") manufactured by Sidel Co. was used to conduct stretch blow molding at a stretch factor (blow-up ratio) of about 8 times (about 2 times in an axial direction and about 4 times in a circumferential direction) by blowing compressed air against the multilayer preform in a cavity of a mold for blow molding under conditions of a blow molding speed of 1,000 BPH, an overall heat of 91% and a multilayer preform temperature of 97 to 99° C. by a hot-parison method, thereby molding a multilayer blow molded container having a volume of 355 ml. With respect to the multilayer blow molded container obtained in such a manner, a thickness distribution of the polyglycolic acid layer at the body was measured and shown in FIG. 2. The oxygen transmission rate of the multilayer blow molded container was 0.05 cc/bottle-day.

Example 2

A multilayer preform was produced in the same manner as in Example 1 except that the injection temperature of the polyglycolic acid was changed from 235° C. to 240° C. The results are shown in Table 1.

This multilayer preform was used to produce a multilayer blow molded container in the same manner as in Example 1. As a result, similar results were yield.

Example 3

A multilayer preform was produced in the same manner as in Example 1 except that a polyglycolic acid homopolymer having a melt viscosity of 505 Pa·s as measured at a temperature of 270° C. and a shear rate of 122 sec$^{-1}$ was used as the polyglycolic acid in place of the polyglycolic acid homopolymer having the melt viscosity of 598 Pa·s. The results are shown in Table 1.

This multilayer preform was used to produce a multilayer blow molded container in the same manner as in Example 1. As a result, similar results were yield.

Example 4

A multilayer preform was produced in the same manner as in Example 1 except that a polyglycolic acid homopolymer having a melt viscosity of 650 Pa·s as measured at a temperature of 270° C. and a shear rate of 122 sec$^{-1}$ was used as the polyglycolic acid in place of the polyglycolic acid homopolymer having the melt viscosity of 598 Pa·s. The results are shown in Table 1.

This multilayer preform was used to produce a multilayer blow molded container in the same manner as in Example 1. As a result, similar results were yield.

Example 5

A multilayer preform was produced in the same manner as in Example 1 except that a polyglycolic acid homopolymer having a melt viscosity of 705 Pa·s as measured at a temperature of 270° C. and a shear rate of 122 sec⁻¹ was used as the polyglycolic acid in place of the polyglycolic acid homopolymer having the melt viscosity of 598 Pa·s. The results are shown in Table 1.

This multilayer preform was used to produce a multilayer blow molded container in the same manner as in Example 1. As a result, evaluation results as to the controllability of thickness of the polyglycolic acid layer in the multilayer preform and the flow mark were rank B.

Example 6

A multilayer preform was produced in the same manner as in Example 1 except that a polyglycolic acid composition obtained by adding 0.03 part by weight of an almost equimolar mixture (trade name "ADK STAB AX-71"; product of ADEKA CORPORATION) of monostearyl acid phosphate and distearyl acid phosphate to 100 parts by weight of a polyglycolic acid having a melt viscosity of 350 Pa·s as measured at a temperature of 270° C. and a shear rate of 122 sec⁻¹ was used as the polyglycolic acid in place of the polyglycolic acid homopolymer having the melt viscosity of 598 Pa·s. The multilayer preform was subjected to stretch blow molding to produce a multilayer blow molded container. The results are shown in Table 1.

Evaluation results as to the controllability of thickness in the multilayer preform, the weldline and the flow mark were all rank A, and an evaluation result as to the thermal decomposition tendency of PGA was rank AA. The resultant multilayer blow molded container exhibited excellent various properties like that in Example 1.

Comparative Example 1

A multilayer preform was produced in the same manner as in Example 1 except that a polyglycolic acid homopolymer having a melt viscosity of 1,000 Pa·s as measured at a temperature of 270° C. and a shear rate of 122 sec⁻¹ was used as the polyglycolic acid in place of the polyglycolic acid homopolymer having the melt viscosity of 598 Pa·s, and the injection temperature of the polyglycolic acid was changed from 235° C. to 255° C. The results are shown in Table 1. With respect to this multilayer preform, the thickness distribution of the polyglycolic acid layer in a vertical direction is shown in FIG. 1. This multilayer preform was used to produce a multilayer blow molded container in the same manner as in Example 1. As a result, the oxygen transmission rate of the resultant multilayer blow molded container was 0.08 cc/bottle·day. With respect to this multilayer blow molded container, a thickness distribution of the polyglycolic acid layer at the body was measured and shown in FIG. 2.

Comparative Example 2

A multilayer preform was produced in the same manner as in Example 1 except that a polyglycolic acid homopolymer having a melt viscosity of 320 Pa·s as measured at a temperature of 270° C. and a shear rate of 122 sec⁻¹ was used as the polyglycolic acid in place of the polyglycolic acid homopolymer having the melt viscosity of 598 Pa·s. The results are shown in Table 1.

Since the polyglycolic acid layer in the multilayer preform was cleaved into 2 layers, and so the controllability of thickness was poor, the stretch blow molding was omitted.

TABLE 1

| | | PGA | | Co-PET | | | | | |
|---|---|---|---|---|---|---|---|---|---|
| | | Melt viscosity (Pa·s) | Injection temperature (° C.) | Melt viscosity (Pa·s) | Injection temperature (° C.) | Melt viscosity ratio x/y | Controllability of thickness | Weld-line | Flow mark | Thermal decomposition of PGA |
| Example | 1 | 598 | 235 | 396 | 290 | 1.51 | A | A | A | A |
| | 2 | 598 | 240 | 396 | 290 | 1.51 | A | A | A | A |
| | 3 | 505 | 235 | 396 | 290 | 1.28 | A | A | A | A |
| | 4 | 650 | 235 | 396 | 290 | 1.64 | A | A | A | A |
| | 5 | 705 | 235 | 396 | 290 | 1.78 | B | A | B | A |
| | 6 | 350 | 235 | 396 | 290 | 0.88 | A | A | A | AA |
| Comparative | 1 | 1,000 | 255 | 396 | 290 | 2.53 | C | B | C | B |
| Example | 2 | 320 | 235 | 396 | 290 | 0.81 | C*¹ | B | A | A |

(Note)
*¹The polyglycolic acid layer was cleaved into 2 layers.

<Consideration>

As apparent from the results shown in Table 1, it is understood that a multilayer preform excellent in the controllability of thickness, little in the disorder of weldline and inconspicuous in flow mark can be obtained by co-injection molding a polyglycolic acid (PGA) at an injection temperature lower than 255° C. so far as the polyglycolic acid has a melt viscosity of 300 to 900 Pa·s, preferably 330 to 900 Pa·s as measured at a temperature of 270° C. and a shear rate of 122 sec⁻¹, and the melt viscosity ratio x/y is 0.85 to 1.80, preferably 0.85 to 1.75, and moreover the thermal decomposition of a residual resin is hard to occur (Examples 1 to 6). When the polyglycolic acid containing a heat stabilizer is used (Example 6), the thermal decomposition of PGA can be greatly inhibited.

On the other hand, when the polyglycolic acid having a melt viscosity of 1,000 Pa·s and the thermoplastic polyester resin having the relationship of a melt viscosity ratio x/y of 2.53 are used, it is difficult to control the thickness even when the injection temperature is raised to 255° C., and the thermal decomposition of the residual resin becomes marked (Comparative Example 1).

When the polyglycolic acid having a melt viscosity of 320 Pa·s and the thermoplastic polyester resin having the relationship of a melt viscosity ratio x/y of 0.81 were used, the controllability of thickness became poor even when the injection temperature was lowered to 235° C., and the polyglycolic acid layer was cleaved into 2 layers (Comparative Example 2).

It is understood from the results shown in FIG. 1 that the multilayer preform (Example 1) obtained by the production process according to the present invention is even in the thickness distribution of the polyglycolic acid compared with the multilayer preform (Comparative Example 1) obtained by using the polyglycolic acid having a melt viscosity of 1,000 Pa·s and the thermoplastic polyester resin having the relationship of a melt viscosity ratio x/y of 2.53 in combination.

In particular, the multilayer preform of Comparative Example 1 is thin in the thickness of the polyglycolic acid at the body in the vicinity of the bottom, and a scatter of thickness is wide.

The results shown in FIG. 2 indicate that the multilayer blow molded container of Comparative Example 1 is thin in the thickness of the polyglycolic acid at the body in the vicinity of the bottom, and a scatter of thickness is wide compared with the multilayer blow molded container of Example 1.

INDUSTRIAL APPLICABILITY

According to the present invention, there can be provided multilayer blow molded containers having a layer structure that a polyglycolic acid layer is provided as a core layer, and thermoplastic polyester resin layers are arranged as inner and outer layers, in which the containers each have a structure that the core layer formed of the polyglycolic acid layer are embedded in between the thermoplastic resin layers, are narrow in a scatter of thickness of the core layer and excellent in gas barrier properties, appearance, molding properties, strength and the like, and a production process thereof.

Since the multilayer blow molded containers according to the present invention have high oxygen gas barrier property and carbon dioxide gas barrier property and are also excellent in heat resistance, strength, appearance and the like, the containers may be used for a wide variety of use applications in the form of various bottles, wide-mouthed bottles, cups or the like. The multilayer blow molded containers according to the present invention have heat resistance enough to stand up to hot-filling. The multilayer blow molded containers according to the present invention are suitable for use as containers for drinks and foods, for example, carbonated fruit juice drinks, lactic acid beverages, beer, wine, soy, sauces, jam, jelly, soups and salad oils.

The invention claimed is:

1. A multilayer blow molded container having a layer structure that a polyglycolic acid layer is provided as a core layer, and thermoplastic polyester resin layers are arranged as inner and outer layers, wherein at a body of the container, the core layer formed of the polyglycolic acid layer is arranged in a state embedded in between the thermoplastic polyester resin layers that are the inner and outer layers, and the core layer formed of the polyglycolic acid layer is not present between the inner and outer layers in at least part of an opening end portion of the container, and the core layer formed of the polyglycolic acid layer is not present between the inner and outer layers in at least part of a bottom of the container, and wherein the melt viscosity x of a polyglycolic acid forming the polyglycolic acid layer is 300 to 900 Pa·s as measured at a temperature of 270° C. and a shear rate of 122 $sec^{-1}$, the melt viscosity y of a thermoplastic polyester resin forming the thermoplastic polyester resin layers is 250 to 600 Pa·s as measured at a temperature of 290° C. and a shear rate of 122 $sec^{-1}$, and a melt viscosity ratio x/y between both melt viscosities is 0.85 to 1.80.

2. The multilayer blow molded container according to claim 1, wherein the melt viscosity of the polyglycolic acid is 330 to 900 Pa·s.

3. The multilayer blow molded container according to claim 1, wherein the melt viscosity of the polyglycolic acid is 400 to 900 Pa·s.

4. The multilayer blow molded container according to claim 1, wherein the melt viscosity of the polyglycolic acid is 450 to 700 Pa·s.

5. The multilayer blow molded container according to claim 1, wherein the melt viscosity of the thermoplastic polyester resin forming the thermoplastic polyester resin layers is 300 to 550 Pa·s.

6. The multilayer blow molded container according to claim 1, wherein the melt viscosity ratio x/y is 0.85 to 1.75.

7. The multilayer blow molded container according to claim 1, wherein the melt viscosity ratio x/y is 0.85 to 1.70.

8. The multilayer blow molded container according to claim 1, wherein the melt viscosity x of the polyglycolic acid is 300 to 900 Pa·s, the melt viscosity y of the thermoplastic polyester resin is 300 to 550 Pa·s, and the melt viscosity ratio x/y between both melt viscosities is 0.85 to 1.70.

9. The multilayer blow molded container according to claim 1, wherein the thermoplastic polyester resin is polyethylene terephthalate or a copolyester containing a polyethylene terephthalate component in a proportion of at least 90 mol %.

10. The multilayer Now molded container according to claim 1, wherein no adhesive layer is arranged between the core layer formed of the polyglycolic acid layer and each of the thermoplastic polyester resin layers of the inner and outer layers.

11. The multilayer blow molded container according to claim 1, wherein the polyglycolic acid layer is formed from a polyglycolic acid containing, as a heat stabilizer, at least one compound selected from the group consisting of heavy metal deactivators, phosphates having a pentaerythritol skeleton structure, phosphorus compounds having at least one hydroxyl group and at least one long-chain alkyl ester group, and metal carbonates.

12. The multilayer blow molded container according to claim 1, which is a stretched multilayer blow molded container subjected to stretch blow molding at a stretch factor of 1.5 to 3 times in an axial direction and a stretch factor of 3 to 5 times in a circumferential direction.

* * * * *